United States Patent
Kawashima et al.

(10) Patent No.: US 6,826,229 B2
(45) Date of Patent: Nov. 30, 2004

(54) DEVICE AND METHOD FOR CODING VIDEO INFORMATION

(75) Inventors: Yuji Kawashima, Tokyo (JP); Atsushi Asano, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 403 days.

(21) Appl. No.: 09/961,305

(22) Filed: Sep. 25, 2001

(65) Prior Publication Data

US 2002/0054639 A1 May 9, 2002

(30) Foreign Application Priority Data

Sep. 27, 2000 (JP) .......................... 2000-293631

(51) Int. Cl.[7] .............................. H04B 1/66; H04N 7/12
(52) U.S. Cl. ........................................... 375/240.03
(58) Field of Search .................. 375/240.02, 240.03, 375/240.04, 240.05, 240.09, 240.12, 240.15, 240.16, 240.23, 240.26; 348/415.1, 416.1; 382/239, 251; H04B 1/66; H04N 7/12

(56) References Cited

U.S. PATENT DOCUMENTS

| | | | | |
|---|---|---|---|---|
| 6,111,991 A | * | 8/2000 | Ribas-Corbera et al. | 382/251 |
| 6,415,057 B1 | * | 7/2002 | Suzuki et al. | 382/239 |
| 6,510,176 B1 | * | 1/2003 | Fukuda et al. | 375/240.02 |

FOREIGN PATENT DOCUMENTS

| | | |
|---|---|---|
| EP | 0470 773 A2 | 2/1992 |
| EP | 0673 172 A2 | 9/1995 |
| EP | 0797 356 A2 | 9/1997 |

OTHER PUBLICATIONS

Kim et al., "An Accurate Rate Control of MPEG Video by Rate–Codewords Modeling", 1997 IEEE Int'l. Symposium on Circuits and Systems, pp. 1261–1264 (1997).
European Search Report dated Apr. 4, 2004.

* cited by examiner

*Primary Examiner*—Tung T. Vo
(74) *Attorney, Agent, or Firm*—Finnegan, Henderson, Farabow, Garrett & Dunner, L.L.P.

(57) ABSTRACT

A video encoder includes a signal processing unit for producing block information such as quantization scale and quantized DCT coefficients and a coding unit for variable-length coding the quantized block information. The amount of generated coded data per unit time (Evop) is estimated from the count (Ncoef(i)) of quantized DCT coefficients contained in block information prior to coding, the amount of coded data (C(y)), and the average codeword length (L(y)) of coded block information. A quantization scale control unit determines the most suitable quantization scale factor on the basis of the target amount of generated coded data (Tvop) and the amount of generated coded data (Evop) and sends it to a quantization unit in the signal processing unit.

9 Claims, 3 Drawing Sheets

DEVICE AND METHOD FOR CODING VIDEO INFORMATION

CROSS-REFERENCE TO RELATED APPLICATIONS

This application is based upon and claims the benefit of priority from the prior Japanese Patent Application No. 2000-293631, filed Sep. 27, 2000, the entire contents of which are incorporated herein by reference.

BACKGROUND OF THE INVENTION

1. Field of the Invention

The present invention relates to a device for coding a digital moving picture video signal and more specifically to a device and method for coding a video signal in a predetermined coding format through the use of an improved method of updating the quantization scale factor.

2. Description of the Related Art

In general, an encoder for coding a video signal, i.e., a moving picture signal, must be arranged to code the video signal in a predetermined format, partition the coded signal into units of a predetermined amount of coded data, and output the resulting bitstream. That is, in order to prevent the occurrence of overflow or underflow at a buffer at the bitstream receiving end, the encoder is required to control the amount of coded data generated in the bitstream.

One of methods for preventing the overflow and underflow is to control the quantization scale factor. The quantization scale factor refers to a factor used for quantizing DCT (Discrete Cosine Transform) coefficients. In an encoding process, one frame of video signal input to the encoder is divided into a number of blocks. Each block is orthogonal-transformed through DCT process to obtain a set of DCT coefficients. The DCT coefficients are quantized based on the quantization scale factor. In general, the amount of generated coded data and the quantization scale factor are inversely proportional to each other. That is, the greater the quantization scale is, the smaller the amount of generated coded data becomes. Thus, the quantization scale is adjusted to control the is amount of generated coded data in a bitstream.

Heretofore, the quantization scale factor is adjusted as follow: First, a video signal is DCT-processed, the resulting DCT coefficients are quantized and variable-length coded. The amount of coded data generated through the variable-length coding is calculated. A comparison is made on a frame or block basis between a preset target amount of coded data and the calculated amount of coded data. The quantization scale factor is determined based on the result of the comparison and updated. Thus, in the prior art, the amount of generated coded data is compared with the target amount of coded data to determine a quantization scale factor to be used in the quantization process. Here, the amount of generated coded data corresponds to the actual amount of variable-length coded data to be output from the encoder as a result of DCT processing, quantization of DCT coefficients and subsequent variable-length coding of quantized DCT coefficients.

As described above, with the conventional method, the actual amount of generated coded data is first determined, and then the quantization scale factor is updated accordingly. Therefore, the video signal processing and the variable-length coding cannot be carried out concurrently, which results in the decreased speed of the overall process of coding a video signal.

BRIEF SUMMARY OF THE INVENTION

It is an object of the present invention to provide a video coding device and method which allows signal processing and variable-length coding to be performed independently and in parallel and is adapted to fast and efficient processing.

According to an aspect of the present invention, there is provided a video coding device comprising:

setting means for setting a target amount of generated coded data in the bitstream;

performing means for performing DCT process on a unit of video information divided into blocks on a block-by-block basis to produce DCT coefficients;

quantizing means for quantizing the DCT coefficients in accordance with a predetermined quantization scale factor to produce quantized DCT coefficients;

coding means for variable-length coding the quantized DCT coefficients to produce a bitstream;

first counter configured to count the number of the quantized DCT coefficients output front the quantization means;

second counter configured to count the amount of generated coded data in the bitstream output from the coding means;

computation means for computing an average codeword length of the quantized DCT coefficients from the number of the quantized DCT coefficients from the first counter and the amount of generated coded data from the second counter; and update means for computing an estimated value of the amount of coded data to be generated for the unit of information, from the average codeword length supplied from the computation means and the number of the quantized DCT coefficients supplied from the first counter, and updating the quantization scale factor in accordance with the target amount of generated coded data and the estimated amount of generated coded data.

According to another aspect of the present invention, there is provided a video coding device comprising:

transform means for performing DCT operations on a unit of video information divided into blocks on a block-by-block basis to produce DCT coefficients;

quantization means for quantizing the DCT coefficients in accordance with a predetermined quantization scale factor to produce quantized DCT coefficients;

set means for setting a target number of quantized DCT coefficients for the unit of video information;

coding means for variable-length coding the quantized DCT coefficients to produce a bitstream;

first counter configured to count the actual number of quantized DCT coefficients output from the quantization means;

second counter configured to count the amount of generated coded data in the bitstream output from the coding means;

average codeword length computation means for computing an average codeword length of the quantized DCT coefficients from the number of the quantized DCT coefficients from the first counter and the amount of generated coded data from the second counter;

target quantized DCT coefficient computation means for computing the target number of the quantized DCT coefficients that is expected to be counted by the first counter on the basis of the target number of the target quantized DCT coefficients; and update means for updating the quantization scale factor in accordance with the actual number of the quantized DCT coefficients and the target number of the quantized DCT coefficients and sending the updated quantization scale factor to the quantization means.

According to still another aspect of the present invention, there is provided a video coding method, comprising steps of:

setting a target amount of generated coded data;

performing DCT operations on a unit of video information divided into blocks on a block-by-block basis to produce DCT coefficients;

quantizing the DCT coefficients in accordance with a predetermined quantization scale factor to produce quantized DCT coefficients;

variable-length coding the quantized DCT coefficients to produce a bitstream;

counting the number of the quantized DCT coefficients output by the quantization step;

counting the amount of generated coded data in the bitstream output by the coding step;

computing an average codeword length of the quantized DCT coefficients from the number of the quantized DCT coefficients obtained by the first counting step and the amount of generated coded data obtained by the second counting step; and computing an estimated value for the amount of generated coded data for the unit of information from the average codeword length and the number of the quantized DCT coefficients and updating the quantization scale factor in accordance with the target amount of generated coded data and the estimated amount of generated coded data.

According to a further aspect of the present invention, there is provided a video coding method, comprising the steps of:

performing DCT operations on a unit of video information divided into blocks on a block-by-block basis to produce DCT coefficients;

quantizing the DCT coefficients in accordance with a predetermined quantization scale factor to produce quantized DCT coefficients;

setting a target number of quantized DCT coefficients for the unit of video information;

variable-length coding the quantized DCT coefficients to produce a bitstream;

counting the number of actual quantized DCT coefficients output by the quantization step;

counting the amount of generated coded data in the bitstream output by the coding step;

computing an average codeword length of the quantized DCT coefficients from the number of the quantized DCT coefficients and the amount of generated coded data;

computing the target number of the quantized DCT coefficients that is expected to be counted by the first-mentioned counting step on the basis of the target number of quantized DCT coefficients; and updating the quantization scale factor in accordance with the actual number of the quantized DCT coefficients and the target number of the quantized DCT coefficients and sending the updated quantization scale factor to the quantization step.

In the above configurations, since the quantization scale factor can be controlled based on the number of the quantized DCT coefficients which are obtained from the each block after the each block being signal processed and before the each block being variable-length coded, the signal processing and the variable-length coding can be carried out independently and in parallel, allowing the overall processing to be speeded up and the amount of generated coded data to be controlled properly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF DRAWINGS

The accompanying drawings, which are incorporated in and constitute a part of the specification, illustrate embodiments of the invention, and together with the general description given above and the detailed description of the embodiments given below, serve to explain the principles of the inventions.

DETAILED DESCRIPTION OF THE INVENTION

Figure 1:
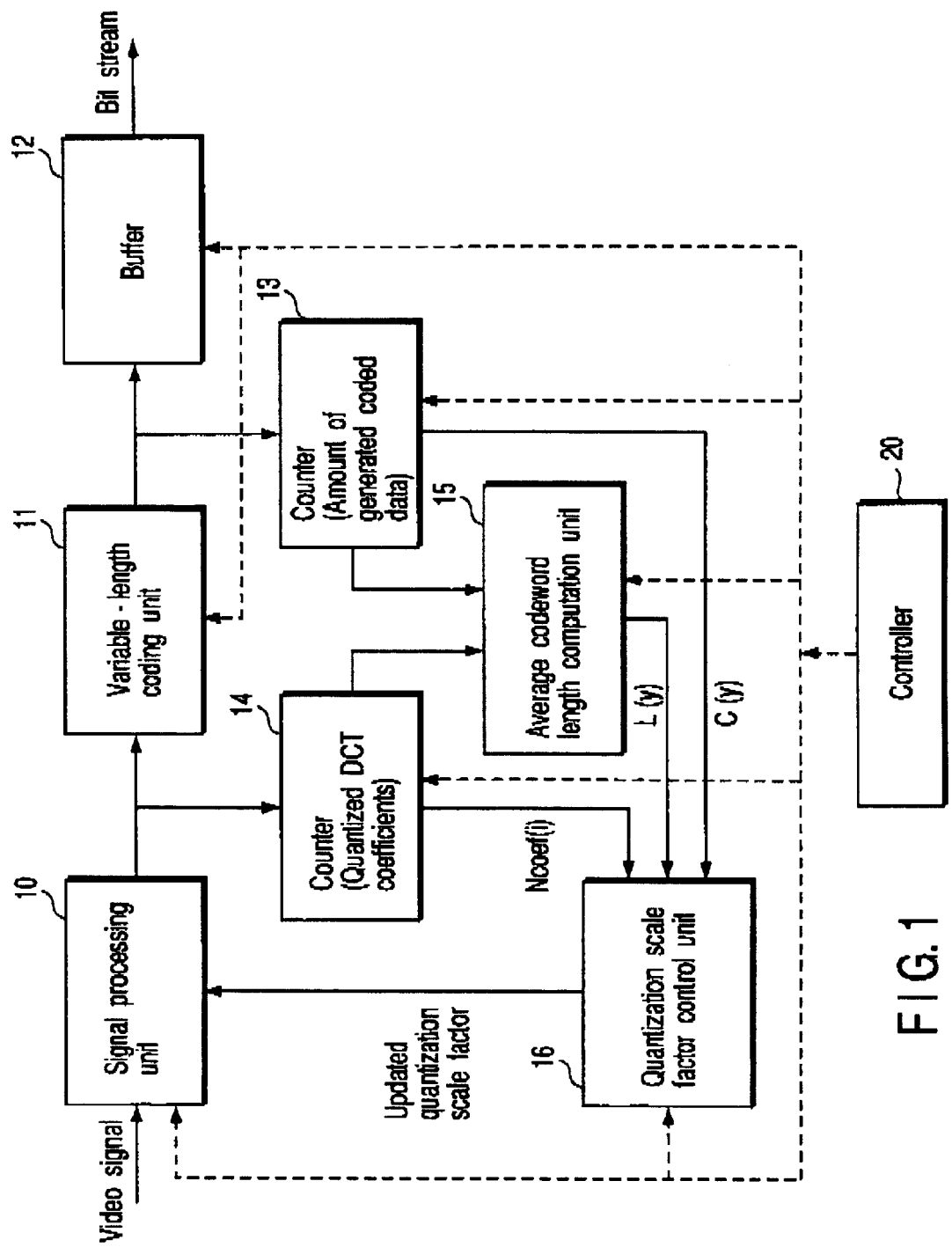
FIG. 1 is a schematic block diagram of a video signal encoder according to an embodiment of the present invention.

Referring now to FIG. 1, there is illustrated, in block diagram form, the arrangement of an encoder for variable-length coding a moving picture signal, or a video signal in accordance with an embodiment of the present invention. The encoder shown in FIG. 1 comprises a signal processing unit 10 for processing and compressing a video signal and a controller 20 for controlling the signal processing unit 10 and other units in the encoder. A digital video signal is supplied to the signal processing unit 10 in units of one video object plane (VOP), on a frame or field basis. In the signal processing unit 10, the video signal is divided into blocks of a given size, i.e., macroblocks (MB), in accordance with a predetermined method. Each macroblock is compressed through signal processing. The compression schemes include the MPEG-4 standard, the ITU-T Rec. H.263 standard, and their modified forms.

Figure 2:
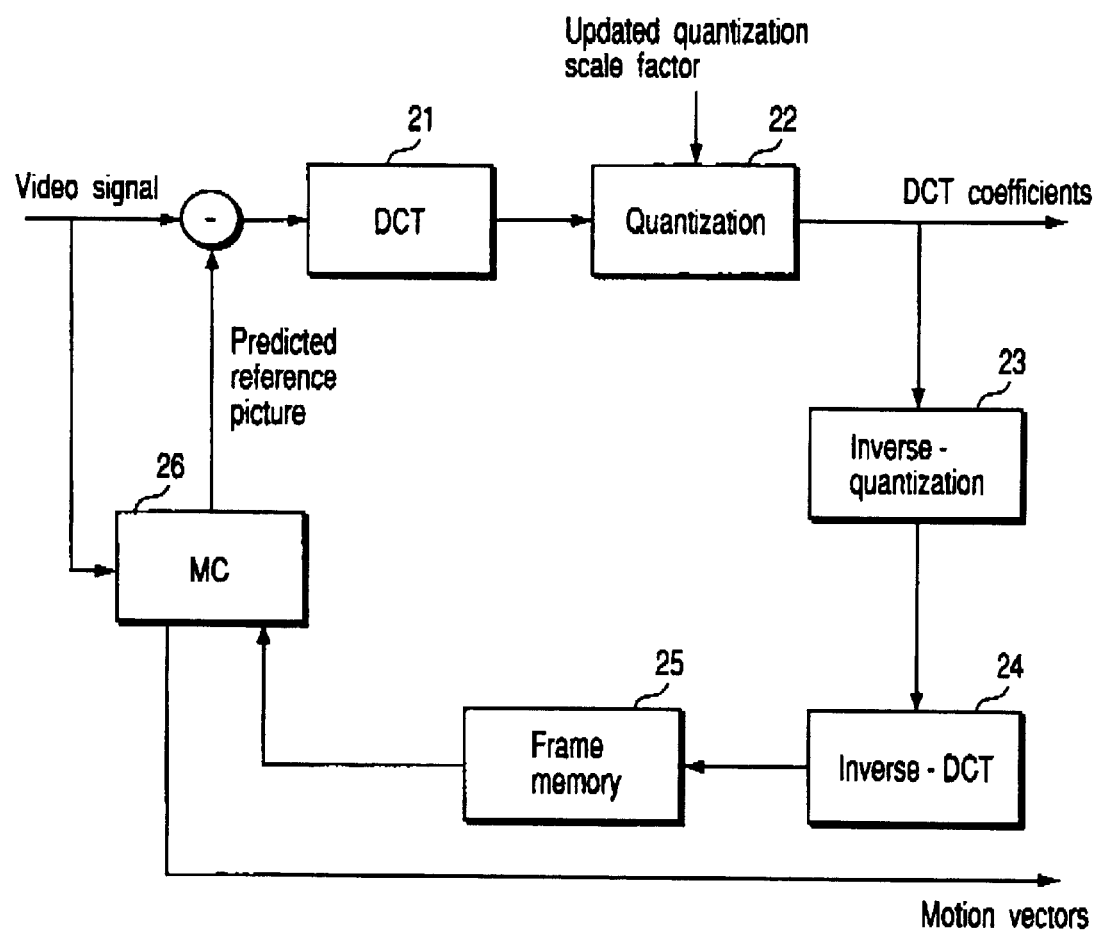
FIG. 2 is a schematic block diagram of the signal processing unit shown in FIG. 1.

The signal processing unit 10 includes a DCT unit 21 and a quantization unit 22 as shown in FIG. 2. The digital video signal input to the signal processing unit 10 under the control of the controller 20 is processed in the DCT unit 21 for each of macroblocks MB that the minimum coded units in each frame or field. That is, the DCT unit 21 performs an orthogonal transform. i.e., DCT operations, on each macroblock MB to obtain a set of DCT coefficients. The DCT coefficients are input to the quantization unit 22 and then quantized independently for each of DC and AC components. The quantization of the DCT coefficients is carried out based on the preset quantization scale factor which will be described later. The quantized DCT coefficients are input to a variable-length coding unit 11 where they are variable-length coded.

The signal processing unit 10 shown in FIG. 2 further includes an inverse quantization unit 23 which performs inverse quantization on the quantized DCT coefficients output from the DCT unit 21 based on the preset quantization scale factor and an inverse DCT unit 24 which performs inverse DCT of inverse-quantized DCT coefficients to inverse DCT coefficients. The signal processing unit 10 further includes a frame memory 25 for storing a frame which is reconstructed based on the inverse DCT coefficients supplied from the inverse DCT unit 24 and a motion compensation (MC) unit 26 which performs inter-frame prediction based the reconstructed frame stored in the frame memory 25 to reconstruct a next frame.

In the signal processing unit 10 shown in FIG. 2, the DCT coefficients are inverse DCT processed to reconstruct a decoded picture, i.e, a reconstrucion frame or field. The frame or field of the decoded picture is compared in the MC unit 26 with the next input frame or field on a macroblock basis. Based on the result of this comparison, motion vectors and a predicted reference picture are output from the MC unit 26. The predicted reference picture and the next frame picture are subtracted prior to DCT process and their difference is DCT coded in the DCT unit 21. The resultant DCT coefficients are then output to the quantization unit 22.

The workings of each of those units have already been described in detail in various books (for instance, "Points-Illustrated Up-to-Date MPEG Textbook") and hence descriptions thereof are omitted here.

Referring back to FIG. 1, the video encoder further includes a variable-length coding unit 11 for variable-length coding the DCT coefficients, a transmission buffer 12 for buffering the bitstream for transmission, a counter unit 13 for counting the amount of coded data in the variable-length bitstream, a counter unit 14 for counting the quantized DCT coefficients, a computation unit 15 for computing the average codeword length of the quantized DCT coefficients from the outputs of the counter units 13 and 14, and a control unit 16 for controlling the quantization scale factor. In order to control a bitstream to be output from the encoder, the controller 20 which controls each of the units as described above, sets a target amount of coded data (a target bit rate) or the number of frames (a target frame rate) and sets the encoder to operate in a rate control or error resilience mode.

The variable-length coding unit 11 performs variable-length coding on input macroblock information (quantized DCT coefficients, motion vectors, etc.) produced by the signal processing unit 10 in accordance with a predetermined syntax and then sends the resulting variable-length coded information to the transmission buffer 12.

The transmission buffer 12 outputs the bitstream supplied from the variable-length coding unit 11 in accordance with the bit rate set by the controller 20.

The counter unit 13 counts the amount of coded data in a signal coded in the variable-length coding unit 11. The counter unit 14 counts the quantized DCT coefficients in the macroblock information produced by the signal processing unit 10. The count in that counter unit is reset to zero as requested by the controller 20.

The computation unit 15 computes the average codeword length of the quantized DCT coefficients from the counts in the counter units 13 and 14. Here, assuming the accumulated count of the amount of generated coded data is Csum and the accumulated count of the quantized DCT coefficients is Nsum, the average codeword length L is defined as Csum/Nsum. The average codeword length L may be set to a variable or fixed value. For example, the average codeword length L may be set to L=8. The accumulated count corresponds to the amount of generated coded data or the total number of quantized DCT coefficients from the time the input of a certain frame is started to the time arbitrary one of the macroblocks in that frame is processed.

The quantization scale control unit 16 estimates the amount of generated coded data on the basis of the count Ncoef(i) of quantized DCT coefficients output from the counter unit 14 and the average codeword length L(y) of quantized DCT coefficients per one macroblock, which is calculated in the computation unit 15 from y macroblocks. Also, the control unit 16 makes a comparison among the estimated value for the amount of coded data to be generated, the amount of generated coded data C(y) output from the counter unit 13 for counting the amount of coded data generated from the coding unit 11, and a preset target amount of generated coded data, and updates the quantization scale factor accordingly. The updated quantization scale factor is applied to the quantization unit 22 shown in FIG. 2.

The method of updating the quantization scale factor will be described in detail below. In the description which follows, it is assumed that the target bit rate set by the controller 20 is Tbr, the target frame rate is Tfr, the number of macroblocks on which signal processing has already been performed by the signal processing unit 10 is x, the number of macroblocks which have already been variable-length coded by the coding unit 11 is y ($x \geq y$), and the total number of macroblocks per frame is Nvop (Nvop$\geq$x$\geq$y).

First Update Procedure (I)

Figures 3, 4:
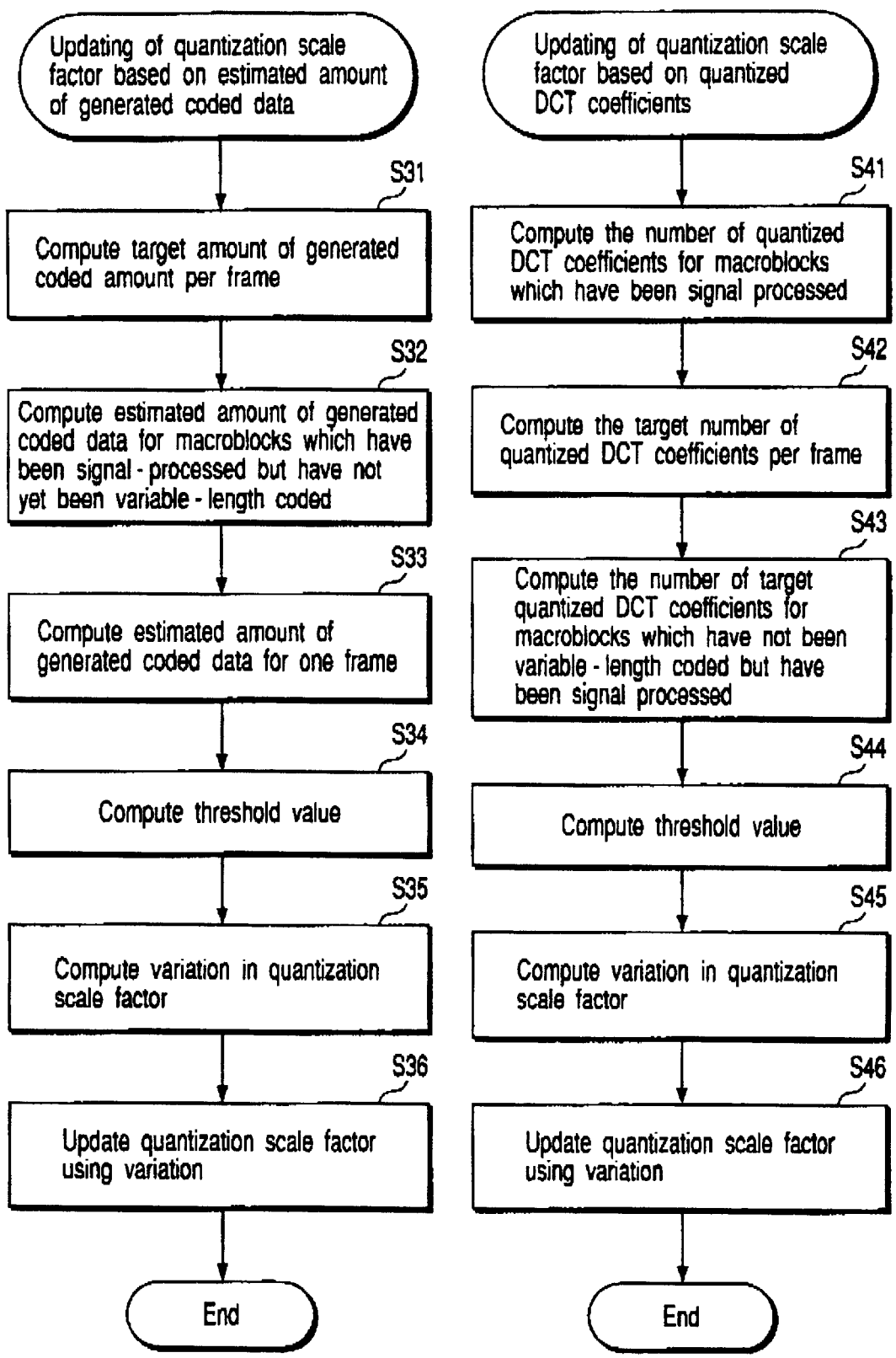
FIG. 3 is a flowchart illustrating a first update procedure of updating a quantization scale factor in accordance with the estimated amount of generated coded data in the encoder of FIG. 1.
FIG. 4 is a flowchart illustrating a second update procedure of updating a quantization scale factor in accordance with the number of quantized DCT coefficients in the encoder of FIG. 1.

In the first procedure, the quantization scale factor is updated in accordance with steps (1) to (6), which will be described with reference to the flowchart shown in FIG. 3.

(1) First, the target amount of generated coded data per frame Tvop is determined in the controller 20 (S31). Tvop is determined as the target bit rate Tbr that is the number of bits transmitted per second divided by the target frame rate Tfr that is the number of frames transmitted per second. That is, Tvop may defined by:

$$Tvop = Tbr/Tfr \quad (1)$$

This equation is an example for obtaining Tvop which may be defined by an another equation.

This computation is carried out in the controller 20 and the computational result is applied to the quantization scale control unit 16.

(2) Next, in S32, the estimated amount of generated coded amount, Ecode(x, y), is determined by the quantization scale control unit 16 in accordance with;

$$Ecode(x, y) = \sum_{i=y}^{x} Ncoef(i) \times L(y) \quad (2)$$

Ecode (x,y) represents the number of bits that is estimated, on the basis of the average codeword length L(y) of quantized DCT coefficients for y macroblocks which have already been variable-length coded, to be generated when the quantized DCT coefficients for the (y+1)st to the x-th macroblocks are variable-length coded.

In the controller 20, when signal processing is performed on y macroblocks, quantized DCT coefficients are produced, which are in turn counted by the counter unit 14. Based on the count Ncoef(i) of the quantized DCT coefficients for the y macroblocks and the average codeword length L(y) obtained by the computation unit 15, the controller 20 estimates the amount of coded data Ecode(x,y) that will be generated for the remaining (x−y) macroblocks. This computation is performed by the quantization scale control unit 16. The count Ncoef(i) corresponds to the count of quantized DCT coefficients for y macroblocks on which signal processing has been performed, and the average codeword length L(y) corresponds to the average codeword length of the quantized DCT coefficients for x macroblocks on which signal processing has been performed.

The estimated amount of generated coded data Ecode(x,y) corresponds to the amount of coded data that is estimated to be generated at the termination of variable-length coding of the (y+1)st to x-th macroblocks.

(3) In step S33, the estimated amount of coded data to be generated, Evop, which is estimated to be generated by processing one frame is determined by the quantization scale control unit 16 in accordance with $$Evop=Ecode(x,y)\times(Nvop-y)/(x-y)+C(y) \qquad (3)$$

where C(y) is the amount of coded data in respect to y macroblocks which have been variable-length coded. This amount of generated coded data is counted by the counter unit 13. (x−y) is the number of the (y+1)st to x-th macroblocks and Ecode(x,y)/(x−y) is the estimated amount of generated coded data corresponding to one macroblock, which is obtained from the (x−y) macroblocks. Thus, Ecode(x,y)×(Nvop−y)/(x−y) corresponds to the amount of generated coded data that is estimated to be generated if the (y+1)st to Nvop-th macroblocks have been variable length coded. Hence, Evop is the estimated value of the amount of coded data that is estimated to be generated at the termination of variable-length coding of quantized DCT coefficients for Nvop macroblocks corresponding to one frame.

(4) Next, a quantization scale factor Q is determined in the quantization scale control unit 16 from the difference, Evop−Tvop, between values obtained in steps (1) and (3) and a certain threshold value Bthrd (S34). The threshold value Bthrd may be a fixed value; otherwise, it may be calculated from the target amount of coded amount Tvop to be $$Bthrd=Tvop\times(1/a) \qquad (4)$$

where a is a positive integer.

(5) In step S35, a variation A in the quantization scale factor is determined in the quantization scale control unit 16 as:

$$A=(Evop-Tvop)/Bthrd \qquad (5)$$

(6) In S36, the quantization scale factor Q is updated in the quantization scale control unit 16 in accordance with the average quantization scale factor Qm within one frame and the variation A in the quantization scale factor as:

$$Q=Qm+A \qquad (b\ 6)$$

Q is applied to the quantization unit of FIG. 2.

In the quantization unit 22, DCT coefficients are quantized based on the updated quantization scale factor Q and the resulting quantized DCT coefficients are sent to the variable-length coding unit 11.

Here, An example where Bthrd=1 and A is a value within a range of −1 to 1, is shown below:

If Evop>Tvop, then Q=Qm+1

If Evop=Tvop, then Q=Qm

If Evop<Tvop, then Q=Qm+1

In the quantization scale update procedure, the number of quantized DCT coefficients is obtained from the output of the signal processing unit 10 and a new quantization scale factor is determined based on this value. That is, the next quantization scale factor can be set on the basis of the results of the signal processing. Thus, in the first update procedure, unlike the prior art, in determining a new quantization scale factor there is no need of waiting for the termination of variable-length coding of quantized DCT coefficients by the variable-length coding unit 11, which allows the entire coding process to be speeded up.

Second Update Procedure (II)

In the above first update procedure (I), the determination of the updated quantization scale factor Q needs the computation of the estimated amount of generated coded data Evop. In contrast to this, the quantization scale factor Q can be updated on the basis of the count of quantized DCT coefficients, Encoef(x,y), without using the estimated amount of generated coded data Evop. This update procedure will be described as the second update procedure with reference to a flowchart shown in FIG. 4. Of symbols used in the following description, the symbols that have already been described are used without describing their definition.

(1) First, the count of quantized DCT coefficients made by the counter unit 14 is given to the quantization scale control unit 16 (S41).

On counting DCT coefficients resulting from DCT processing of the (y+1)st to x-th macroblocks, the counter unit 14 provides the DCT coefficients count Encoef(x,y) given by:

$$Encoef(x, y) = \sum_{i=y}^{x} Ncoef(i) \qquad (7)$$

(2) The target number of quantized DCT coefficients produced from one frame is determined, in S42, in the quantization scale control unit 16 as:

$$Tncoef=Tvop/L(y) \qquad (8)$$

The target number Tncoef corresponds to the target total number of DCT coefficients resulting from all macroblocks that constitute one frame. The target amount of generated coded data per frame, Tvop, has been set in advance in the controller 20 and is presented to the quantization scale control unit 16. In the quantization scale control unit, the target total number of quantized DCT coefficients, Tncoef, is calculated from the target amount of generated coded data Tvop. This computation is carried out by the quantization scale control unit 16; the same is true in the case of computations in steps (3), (4), (5) and (6) to be described later.

Expression (8) indicates that the total number of quantized DCT coefficients to be coded is obtained by dividing the target amount of coded data per frame, Tvop, by the average codeword length L(y).

(3) In S43, the total count Txy of quantized DCT coefficients corresponding to DCT coefficients on which the variable-length coding process has not been performed yet but the signal processing has been performed is determined by:

$$Txy=Tncoef\times(x-y)/Nvop \qquad (9)$$

The quantization scale control unit 16 determines the target number Txy of the quantized DCT coefficients on the basis of the target total number Tncoef of quantized DCT coefficients computed in (2).

The target number of quantized DCT coefficients Txy, corresponds to the total number of DCT coefficients which will be counted by the counter unit 14 if the (y+1)st to x-th macroblocks are processed in the signal processing unit 10. Here, Nvop is the total number of macroblocks and Tncoef/Nvop is the number of quantized DCT coefficients per one macroblock.

(4) Next, a quantization scale factor is determined from the difference, Encoef(x,y)−Txy, between values obtained in steps (1) and (3) and a certain threshold value Nthrd (S44). Here, Encoef(x,y) is an actual count and Txy is a target estimated count. The threshold value Nthrd may be a fixed value; otherwise, it may be calculated from the target bit rate Tbr by:

$$Nthrd = Tbr \times b \quad (10)$$

wherein b is a positive integer.

The threshold Nthrd is a variable value which is changed depending on the target bit rate.

(5) In step S45, a variation B in the quantization scale factor is determined in the quantization scale control unit 16 by:

$$B = (Encoef(x,y) - Txy)/Nthrd \quad (11)$$

(6) In S46, the quantization scale factor Q is updated in accordance with the average quantization scale factor Qm within one frame and the variation B in the quantization scale factor as follows:

$$Q = Qm + B \quad (12)$$

wherein Q is applied to the quantization unit 22 of FIG. 2.

In the second quantization scale update procedure as well, the number of quantized DCT coefficients is obtained from the output of the signal processing unit 10 and a new quantization scale factor is determined based on this value. Therefore, the next quantization scale factor can be set on the basis of the processing results from the signal processing unit, thus allowing the entire coding process to be speeded up.

Although, in the two quantization scale factor update procedures, the target amount of generated coded data or the target number of quantized DCT coefficients is determined on a frame-by-frame basis, this is not restrictive. The target value may be set on a macroblock or macroblock group basis as in video packets. Further, the target value may be set on a frame group basis as in a group of pictures (GOP).

As can be seen from the foregoing, the amount of generated coded data can be controlled by updating the quantization scale factor; however, updating of the quantization scale factor influences the picture quality. That is, the greater the quantization scale factor, the lower the picture resolution becomes. Thus, changing the quantization scale factor over a wide range within one frame results in a frame picture having some portions of good picture quality and some portions of bad picture quality. It is therefore allowed to limit A or B that is the variation in the quantization scale factor or the quantization scale factor Q after being updated. This limitation should be considered not only from a picture quality viewpoint but from a system syntax viewpoint.

In MPEG-4, the quantization scale factor within each frame is changed using the field value called quant_scale and the field value called dquant in VP (Video Packet) header information for a group of macroblocks. The quant_scale is the quantization scale factor and can be set to any value. The dquant is a difference in quantization scale factor from the immediately preceding macroblock and can take only a value in the range from −2 to +2. This therefore must be considered in updating the quantization scale factor. In particular, in MPEG-4 coding wherein a resynchronization marker-is not used, since only the dquant is used, the quantization scale factor needs to be limited. For this reason, in order to limit the quantization scale factor updated in accordance with the previously described first and second update procedures, further processing is performed. That is, Q is limited such that the difference from the quantization scale factor Qp for the immediately preceding macroblock on which signal processing has been performed becomes $K \leq Q - Qp \leq K$ where K is a positive integer. To be specific, if $-K \leq Q - Qp \leq K$, then $Q = Q$
if $Q - Qp > K$, then $Q = Qp + K$
if $Q - Qp < K$, then $Q = Qp - K$ When K=2, the limitation coincides with the limitation on the dquant value in the MPEG-4 syntax. In addition, when coded VOP is B-VOP (B-picture VOP), Q is defined as follows:

if $Q - Qp \geq 2$, then $Q = Qp + 2$
if $Q - Qp \leq 2$, then $Q = Qp - 2$
if $-1 \leq Q - Qp \leq 1$, then $Q = Qp$ Limiting the quantization scale factor to be updated in this manner allows the quantization scale factor to be limited at the stage of signal processing in the case of MPEG-4 coding in resynchronizing marker-free mode in particular, which allows a bitstream to be produced to conform to the MPEG-4 syntax.

According to the embodiment, as described above, a new quantization scale factor value can be set from quantized DCT coefficients which are part of the output of the signal processing unit 10. Thus, the prior need to determine a new quantization scale factor after the variable-length coding process is eliminated. For this reason, quantization scale factor control is allowed while carrying out each of signal processing and variable-length coding are not related each other and carried out independently and in parallel. As a result, the entire coding process can be speeded up.

Controlling the quantization scale factor while performing the signal processing and the variable-length coding independently and in parallel allows the step of signal processing and the step of variable-length coding to be performed separately. Thus, when the coding process is implemented with a single processor, a number of macroblocks can be processed collectively in a group and the group of macroblocks are performed on signal processing and variable-length coding without performing signal processing and variable-length coding in units of one macroblck. For this reason, overhead which is caused by changing between signal processing and variable-length coding can be decreased, the overhead relating number of time the program command is downloaded due to a cache hit miss. Moreover, when multiple processors are used, each of the signal processing and the variable-length coding can be performed on a separate processor, allowing more efficient and faster processing.

Additional advantages and modifications will readily occur to those skilled in the art. Therefore, the invention in its broader aspects is not limited to the specific details and representative embodiments shown and described herein. Accordingly, various modifications may be made from without departing from the spirit or scope of the general inventive concept as defined by the appended claims and their equivalents.

What is claimed is:

1. A video coding device comprising:

setting means for setting a target amount of generated coded data;

performing means for performing DCT operations on a unit of video information divided into blocks on a block-by-block basis to produce DCT coefficients;

quantizing means for quantizing the DCT coefficients in accordance with a predetermined quantization scale factor to produce quantized DCT coefficients;

coding means for variable-length coding the quantized DCT coefficients to produce a bitstream;

first counter configured to count the number of the quantized DCT coefficients output from the quantization means;

second counter configured to count the amount of generated coded data in the bitstream output from the coding means;

computation means for computing an average codeword length of the quantized DCT coefficients from the number of the quantized DCT coefficients from the first counter and the amount of generated coded data from the second counter; and update means for computing an estimated value of the amount of coded data to be generated for the unit of information, from the average codeword length supplied from the computation means and the number of the quantized DCT coefficients supplied from the first counter, and updating the quantization scale factor in accordance with the target amount of generated coded data and the estimated amount of generated coded data.

2. The device according to claim 1, wherein the set means is adapted to set a target bit rate Tbr which is the number of bits transmitted per second and a target frame rate Tfr which is the number of frames transmitted per second and then set the target amount of generated coded data Tvop as:

$$Tvop = Tbr/Tfr.$$

3. The device according to claim 1, wherein the estimated value Evop of the amount of coded data to be generated is given by:

$$Evop = Ecode(x,y) \times (Nvop-y)/(x-y) + C(y)$$

where $C(y)$ is the amount of generated coded data resulting from DCT coefficients for y macroblocks which have been variable-length coded and counted by the second counter, (x−y is the number of macroblocks from the (y+1)st macroblock through the x-th macroblock, and $Ecode(x,y)$ is the number of bits that is estimated, on the basis of the average codeword length L(y) of quantized DCT coefficients for y macroblocks which have been variable-length coded, to be generated when the quantized DCT coefficients for the (y+1)st to the x-th macroblocks are variable-length coded and given by $$Ecode(x,y) = \Sigma Ncoef(i) \times L(y).$$

4. The device according to claim 1, wherein the quantization scale factor Q is updated in accordance with the average Qm of quantization scale factors for the unit of video information and a variation A by:

$$Q = Qm + A$$

where A is given by $$A = (Evop - Tvop)/Bthrd, \text{ and}$$

wherein the quantization scale factor Q is obtained from (Evop−Tvop) and a threshold value Bthrd.

5. A video coding device comprising:

transform means for performing DCT operations on a unit of video information divided into blocks on a block-by-block basis to produce DCT coefficients;

quantization means for quantizing the DCT coefficients in accordance with a predetermined quantization scale factor to produce quantized DCT coefficients;

set means for setting a target number of quantized DCT coefficients for the unit of video information;

coding means for variable-length coding the quantized DCT coefficients to produce a bitstream;

first counter configured to count the actual number of quantized DCT coefficients output from the quantization means;

second counter configured to count the amount of generated coded data in the bitstream output from the coding means;

average codeword length computation means for computing an average codeword length of the quantized DCT coefficients from the number of the quantized DCT coefficients from the first counter and the amount of generated coded data from the second counter;

target quantized DCT coefficient computation means for computing the target number of the quantized DCT coefficients that is expected to be counted by the first counter on the basis of the target number of the target quantized DCT coefficients; and update means for updating the quantization scale factor in accordance with the actual number of the quantized DCT coefficients and the target number of the quantized DCT coefficients and sending the updated quantization scale factor to the quantization means.

6. The device according to claim 5, wherein the update means determines a variation B in the quantization scale factor as:

$$B = (Encoef(x,y) - Txy)/Nthrd$$

where Nthrd is a threshold value, $Encoef(x,y)$ is the actual number of quantized DCT coefficients, and Txy is the target number of the quantized DCT coefficients.

7. The device according to claim 5, wherein the number target Txy of the quantized DCT coefficients is the number of DCT coefficients that have not yet been variable-length coded by the coding means but have already been quantized by the quantization means is given by:

$$Txy = Tncoef \times (x-y)/Nvop$$

Txy corresponds to the total number of DCT coefficients that are expected to be counted by the count unit 14 if the (y+1)st to the x-th macroblocks are processed by the signal processing unit 10, Nvop is the total number of blocks, Tncoef/Nvop corresponds to the number of DCT coefficients for an average block, Tncoef is the target number of quantized DCT coefficients and given by:

$$Tncoef = Tvop/L(y).$$

8. A video coding method, comprising steps of:

setting a target amount of generated coded data;

performing DCT operations on a unit of video information divided into blocks on a block-by-block basis to produce DCT coefficients;

quantizing the DCT coefficients in accordance with a predetermined quantization scale factor to produce quantized DCT coefficients;

variable-length coding the quantized DCT coefficients to produce a bitstream;

counting the number of the quantized DCT coefficients, Ncoef(i), output by the quantization step;

counting the amount of generated coded data in the bitstream output by the coding step;

computing an average codeword length of the quantized DCT coefficients from the number of the quantized DCT coefficients obtained by the first counting step and the amount of generated coded data obtained by the second counting step; and computing an estimated value for the amount of generated coded data for the unit of information from the average codeword length and the number of the quantized DCT coefficients and updating the quantization scale factor in accordance with the target amount of generated coded data and the estimated amount of generated coded data.

9. A video coding method comprising the steps of:

performing DCT operations on a unit of video information divided into blocks on a block-by-block basis to produce DCT coefficients;

quantizing the DCT coefficients in accordance with a predetermined quantization scale factor to produce quantized DCT coefficients;

setting a target number of quantized DCT coefficients for the unit of video information;

variable-length coding the quantized DCT coefficients to produce a bitstream;

counting the actual number of quantized DCT coefficients output by the quantization step;

counting the amount of generated coded data in the bitstream output by the coding step;

computing an average codeword length of the quantized DCT coefficients from the number of the quantized DCT coefficients and the amount of generated coded data;

computing the target number of the quantized DCT coefficients that is expected to be counted by the first-mentioned counting step on the basis of the target number of quantized DCT coefficients; and updating the quantization scale factor in accordance with the actual number of the quantized DCT coefficients and the target number of the quantized DCT coefficients and sending the updated quantization scale factor to the quantization step.

* * * * *

UNITED STATES PATENT AND TRADEMARK OFFICE
CERTIFICATE OF CORRECTION

| | |
|---|---|
| PATENT NO. | : 6,826,229 B2 |
| DATED | : November 30, 2004 |
| INVENTOR(S) | : Kawashima et al. |

It is certified that error appears in the above-identified patent and that said Letters Patent is hereby corrected as shown below:

<u>Column 11,</u>
Line 50, change "(x-y" to -- (x-y) --.

Signed and Sealed this

First Day of March, 2005

JON W. DUDAS
*Director of the United States Patent and Trademark Office*